(12) United States Patent
Wang

(10) Patent No.: US 8,607,300 B2
(45) Date of Patent: Dec. 10, 2013

(54) NETWORK SECURITY POLICY MEDIATION

(75) Inventor: Haojin Wang, Allen, TX (US)

(73) Assignee: Genband US LLC, Plano, TX (US)

( * ) Notice: Subject to any disclaimer, the term of this patent is extended or adjusted under 35 U.S.C. 154(b) by 1605 days.

(21) Appl. No.: 11/458,262

(22) Filed: Jul. 18, 2006

(65) Prior Publication Data

US 2008/0034401 A1 Feb. 7, 2008

(51) Int. Cl.
*G06F 17/00* (2006.01)

(52) U.S. Cl.
USPC .................................. 726/1; 726/14

(58) Field of Classification Search
USPC .......................... 705/500; 726/1, 4
See application file for complete search history.

(56) References Cited

U.S. PATENT DOCUMENTS

| | | | |
|---|---|---|---|
| 6,738,908 B1 * | 5/2004 | Bonn et al. | 726/4 |
| 8,032,409 B1 * | 10/2011 | Mikurak | 705/14.39 |
| 2003/0061388 A1 * | 3/2003 | Cleghorn et al. | 709/246 |
| 2003/0235280 A1 * | 12/2003 | Shafie-Khorasani et al. | 379/112.01 |
| 2004/0111643 A1 * | 6/2004 | Farmer | 713/201 |
| 2006/0206440 A1 * | 9/2006 | Anderson et al. | 705/500 |
| 2009/0049202 A1 * | 2/2009 | Pattison et al. | 709/249 |
| 2011/0302554 A1 * | 12/2011 | Rivas et al. | 717/109 |

OTHER PUBLICATIONS

Stewart, Randall et al., "SCTP New Transport Protocol for TCP/IP", Nov.-Dec. 2001, IEEE Internet Computing, pp. 64-69.*

* cited by examiner

*Primary Examiner* — Brandon Hoffman
*Assistant Examiner* — Carlos Amorin
(74) *Attorney, Agent, or Firm* — Jenkins, Wilson, Taylor & Hunt, P.A.

(57) ABSTRACT

Methods and systems for mediating between first and second network security policies, by: (1) mapping a first security policy to a generic second security policy, and (2) mapping the generic second security policy to a plurality of rules each associated with a target network security policy.

13 Claims, 11 Drawing Sheets

NETWORK SECURITY POLICY MEDIATION

BACKGROUND

As media on differing networks are being converged, a challenge is presented in keeping a consistent security policy from one end to the other. For example, when signaling (SS7), PSTN, IP and wireless networks are converged to provide a bundle of services, there is no satisfactory way to enforce a consistent security policy.

Currently, there does not exist a systematic way to communicate a security policy from one network to another. This is largely caused by the fact that the security policies deployed on each network are often incompatible with each other. The result of such incompatibility is that security is available only in part of the converged, heterogeneous network. Thus, security holes are created in various end-to-end networking scenarios.

Further, the current approach is to hard-code one-to-one mapping between two networks with two different security policies. However, this approach is very effort-intensive and costly, and it is difficult to scale up to multiple networks.

A challenge of achieving end-to-end security policy is that a network can only speak and understand its own security policy and has little knowledge of the security policy of a connected network. As the number of interconnected networks increases, the level of difficulty in achieving an end-to-end, consistent security policy increases substantially, if not exponentially.

A further challenge of achieving end-to-end security policy is that network security policies are network specific and different from one another. For example, authentication or encryption at an IP network is quite different from the authentication or encryption of a UMTS or PSTN network. In addition, specific implementations within a security policy may be local to a particular network, and subsequently may not be directly transported to a different network. Additionally, the enforcement mechanism for one network often cannot be used at a different network. Yet another challenge exists in that there is a need to address security concerns at different network layers, such as at the signaling, transport and application level.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
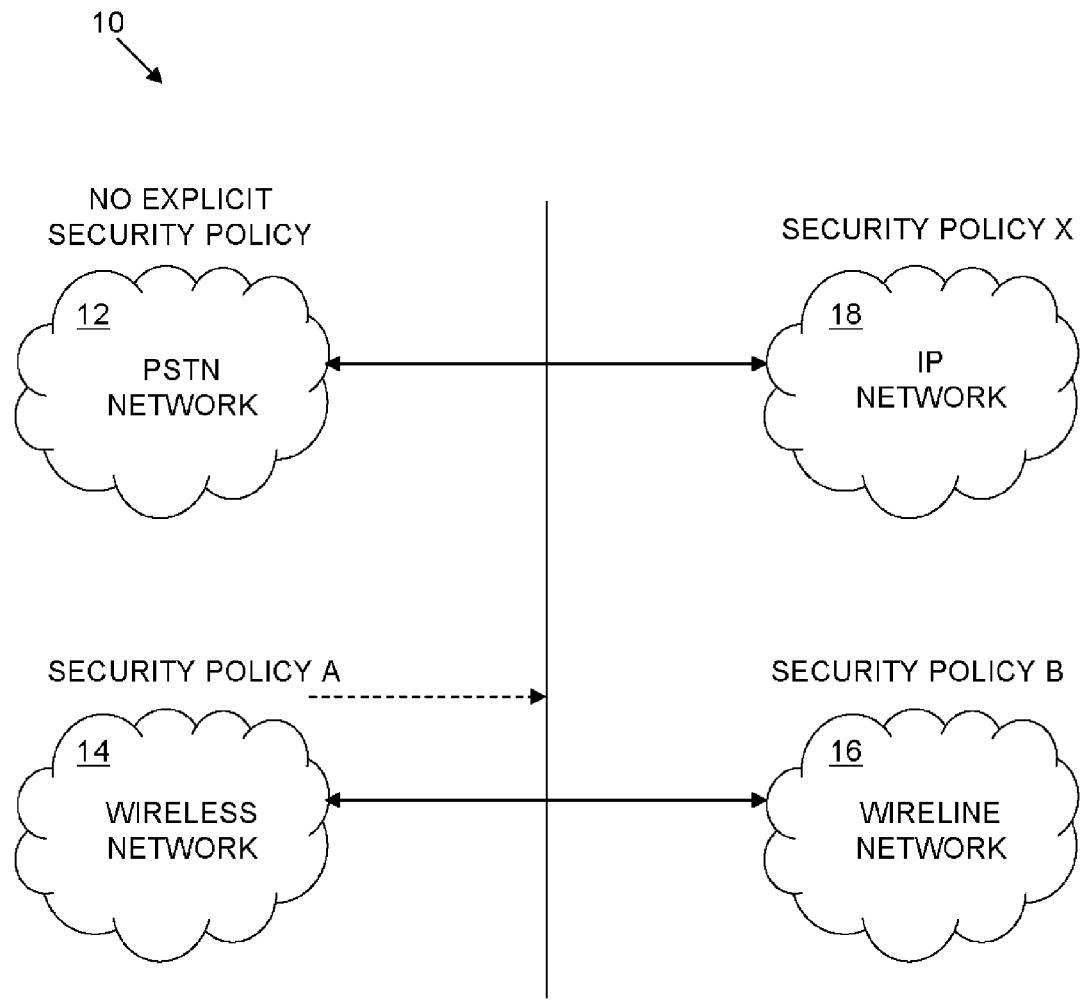
FIG. 1 is a block diagram of a conventional security policy application for a communications network.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed, although such relationship may, at other times, indeed exist.

As VoIP and IP based multimedia services are being deployed on an increasingly large scale, and multiple types of networks are integrated into convergent networks, it has become a major challenge to achieve end-to-end security with consistent security policy across different types of networks and networking technologies. Conventional networks of different networking technologies employ different network security standards and security policies. For example, when a signaling network (e.g., SS7), a PSTN network, a broadband IP network and a wireless network are connected together to provide a bundle of services, there is no a single, consistent way to enforce security policy. That is, there has not been a systematic way to communicate a security policy from one network to another because the different security policies are often incompatible. Incompatible security policies between networks can result in security being available in only part of a heterogeneous network, thus creating security holes in an end-to-end networking scenario.

Referring to FIG. 1, illustrated is a block diagram of a conventional security policy application for a communications network 10. The network 10 includes a PSTN network 12 having no specific security policy, a wireless network 14 having specific security policy A, a wireline network 16 having specific security policy B, and an IP network 18 have specific security policy X. Where one of the networks (e.g., 14, 16, or 18) has a security policy and another network (e.g., 12) has no security policy, there may be no end-to-end security policy for calls between the networks. Moreover, where two networks (e.g., 14 and 16) have two different, non-interoperable security policies, there may be no consistent end-to-end security policy for inter-network calls, such that either of the security policies may be effectually reduced, at a minimum.

Figure 2:
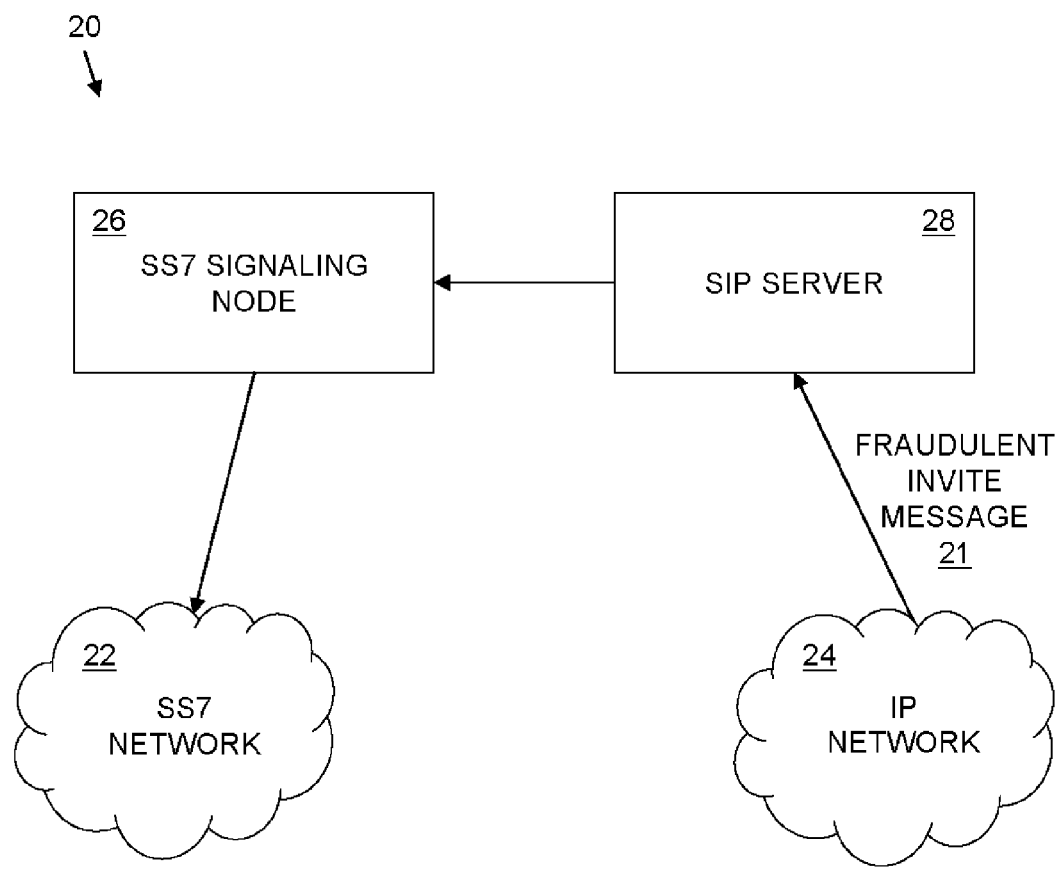
FIG. 2 is a block diagram of a conventional security policy application for a communications network.

Referring to FIG. 2, illustrated is a block diagram of a conventional security policy application for a communications network 20. The network 20 includes an SS7 network 22, an IP network 24, an SS7 signaling node 26, and an SIP server 28. Network 20 is an environment demonstrating the potential security threat to a convergent communications network that comprises multiple networks of different types. For example, there are no security checks across network boundaries. Consequently, a fraudulent SIP Invite message 21 may be injected from the IP network 24 and subsequently propagated into the SS7 network 22 via the SIP server 28 and the SS7 signaling node 26. Message authentication may be applied to the SIP/IP side for all terminating signaling messages while nothing may be similarly performed on the SS7 side. However, the SIP security policy may include authenticating the message to verify the authenticity of the sender, and if the same security policy had been enforced at the other connected network, the fraudulent signaling message may have been stopped.

A conventional approach to resolving the above-described problems has been to hard-code one-to-one mapping between two networks with two different security policies. This approach can be very effort-intensive and costly, and may be difficult to scale-up to multiple networks. It also does not allow the addition of new network types after system installation.

One challenge to achieving end-to-end security policy consistency is that a network may only speak and understand its own security policy, and may have little knowledge of the security policy of a connected network. When the number of interconnected networks increases, the level of difficulties in achieving an end-to-end, consistent security policy increases substantially, possibly exponentially.

As described above, achieving end-to-end security policy consistency is challenging because a network security policy can be network specific and, thus, different relative to security policies of other networks. For example, authentication or encryption at an IP network can be quite different from the authentication or encryption of a UMTS or PSTN network. Security modules are local to a particular network and cannot be directly transported to a different network. The enforcement mechanism for one network cannot be used at a different network.

In view of the above, the present disclosure introduces a rule-based security policy translator to convert a network-specific security policy into a generic security policy, as well as an enforcement assembler module configured to convert the generic security policy into a security policy module executable at a target network. Such a rule-based security policy convention may be flexible to accommodate different networks and network conditions. Instead of manually translating one security policy directly to another policy of a second network, the present disclosure introduces a security policy mediation device that, potentially automatically, mediates and negotiates between any two security policies and translates a first security of the first network into a set of executable modules of the second network that are ready to be enforced at the second network, thus achieving end-to-end consistent security policy.

Figure 3:
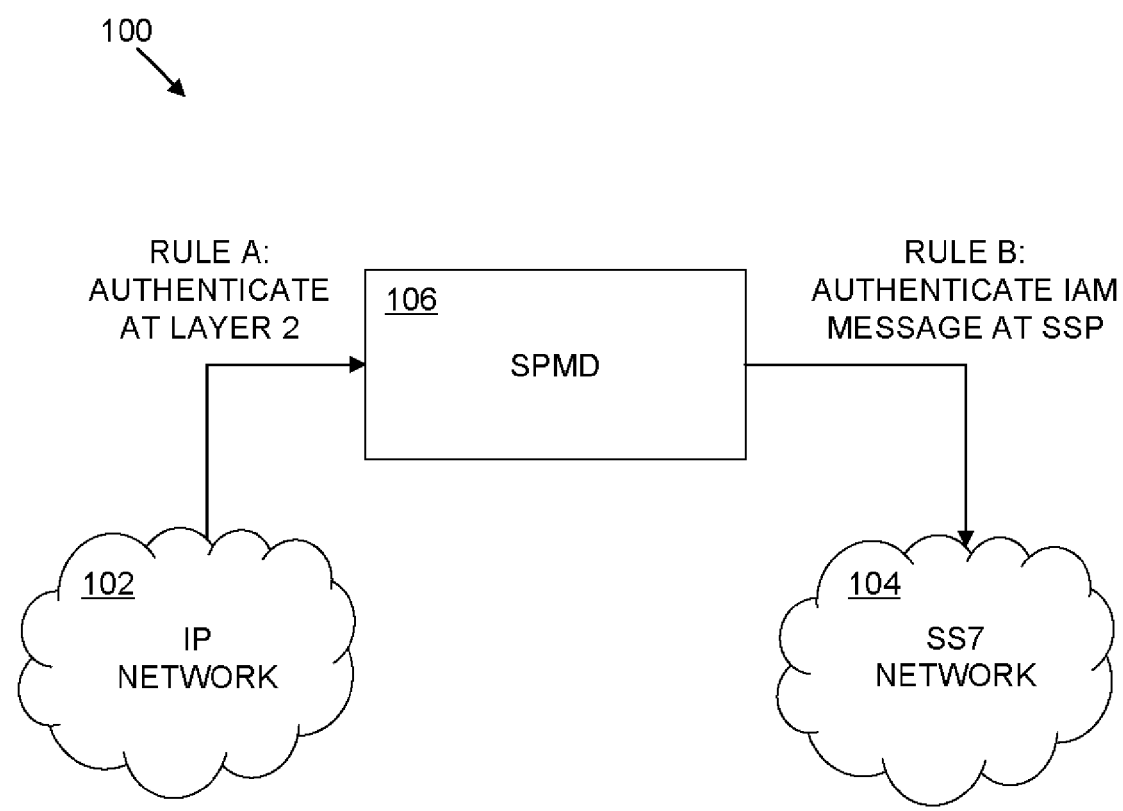
FIG. 3 is a block diagram of at least a portion of a communications network including a security policy mediation device (SPMD) according to one or more aspects of the present disclosure.

Referring to FIG. 3, illustrated is a block diagram of at least a portion of a communications network 100 demonstrating one or more aspects of the present disclosure. The network 100 includes an IP network 102 and an SS7 network 104, as well as a security policy mediation device (SPMD) 106 according to one or more aspects of the present disclosure. The IP network 102 has a security policy of authenticating a message header at layer 2 of a packet network. However, for example, the SPMD may be configured such that this security policy is translated into a security policy of "authenticate IAM message at SSP" for the SS7 network 104 (where the IAM message is an Initial Address Message and SSP is a Service Switching Point).

Figure 4:
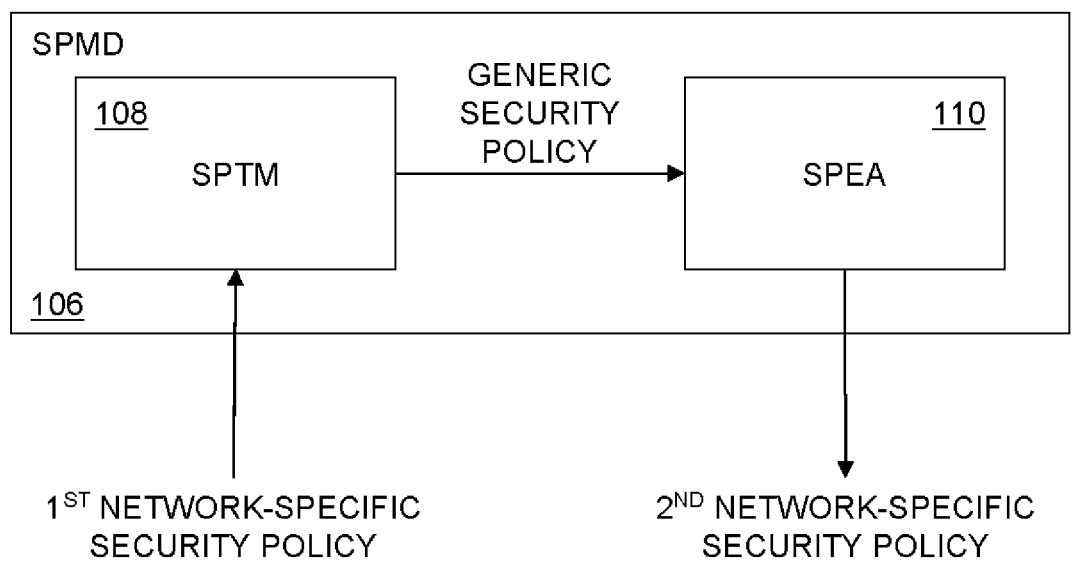
FIG. 4 is a block diagram of at least a portion of an SPMD according to one or more aspects of the present disclosure.

Referring to FIG. 4, illustrated is a block diagram of at least a portion of the SPMD 106 shown in FIG. 3 according to one or more aspects of the present disclosure. The SPMD 106 includes a security policy translation module (SPTM) 108 configured to translate a first set of security policy rules specific to a first or originating network into a set of generic security policy rules that are independent of any specific network technology. Then, via a security policy enforcement assembler (SPEA) 110, and possibly with the help of a security policy rule repository and a knowledge base (shown in subsequent figures), the network-independent security policy rule components may be mapped into a set of ready-to-execute modules that are specific to and executable at a second or target network.

Referring to FIGS. 3 and 4, collectively, the IP network specific rule "authenticate message header at layer 2" of the first network (i.e., IP network 102) can be translated into the network-independent rule "authenticate signaling message header at transport layer" via the SPTM 108. The generic, network-independent rule components can then be mapped to a rule of the second network (i.e., SS7 network 104) via the SPEA 110, such as to become the SS7 network-specific rule "authenticate IAM message at SSP node." For example, the SPEA 110 may be configured to search a security module repertoire and, if all variables and conditions are met, an executable module can be output from the SPMD 106 and downloaded into the second, target network (i.e., SS7 network 104). The IAM and SSP are each specific to the SS7 network 104, although the original message was specific to the IP network 102.

The above process may comprise the following three steps, among others. First, the SPTM 108 may be configured to convert a network specific policy into a network-independent policy, "authenticate initialization message at an edge node." The rule translation may, for example, include mapping from a network specific rule to a network-independent rule.

Second, post-translation processing may be executed to "trim" that part of a rule that is not supported by the SPMD 106 or the second, target network. Thereafter, the network-independent policy rule may be fed into the SPEA 110 to find one or more network security policy modules that are enforceable at the second, target network.

Results of this approach may include the ability to check the validity of a rule, to enable the establishment of a security policy rule repertoire, and to support multiple network technologies rather than one-to-one mapping. This approach may also provide the flexibility to map from any security policy to any other security policy, possibly in an automated manner. Moreover, each security policy can be expressed in the security policy rules that are local to a specific network, that are understandable by only that particular network, and that are enforceable by that network.

Network security policies may be expressed in the form of security policy rules. Each security policy rule may, in turn, be expressed in the form of one or more security policy rule components and actions. A security policy rule component may represent a security mechanism specific to a particular network and enforceable by that network.

A security policy may cover a variable number of network security areas. For example, the general areas covered in a security policy may include encryption, authentication, and authorization, among others.

Aspects of encryption may include, without limitation, an encryption scheme and encryption key generation and distribution. Examples of encryption schemes include public-key based encryption (e.g., RSA) and symmetric key based encryption (e.g., digital encryption standard, or DES), among others. Moreover, encryption key generation and/or distribution may be conventional or future-developed.

Aspects of authentication may include, without limitations, authentication targets and authentication mechanisms. Examples of authentication targets may include message body authentication, message header authentication, user authentication, and entity/site authentication, among others. Examples of authentication mechanisms may include password, digital signature, and biometric, among others. Mechanisms of authorization may include access control and/or content control, among others.

A security policy may address security concerns at different layers of a network. Thus, for example, the SPMD 106 may be configured to address security issues at one or more of the media level security, the signaling level security, and/or the application level security.

A network security policy rule may be based on generic rules that may be widely used in artificial intelligence systems, and may include a rule condition and a rule action. A security policy rule condition may represent one or more network situations or conditions, such as "traffic is business-class" (vs. residential class) or "the media gateway is a network edge node" (vs. an intermediate node), among others. Multiple conditions may be combined in a single rule, such as by connection via the conjunctive AND or OR. A security policy rule action may represent one or more actions to be taken when prescribed conditions are met. Multiple actions may be combined in a single rule, such as by connection via the conjunctive AND or OR.

An example security policy rule, set forth below, demonstrates the possible structure of a security policy rule:

Rule A:
  If traffic type is VoIP, authenticate message header;
  Else if traffic type is business communication, apply public-key/RSA encryption to message body.

Possibly like the rules of some generic artificial intelligence systems, security policy rules may comprise a set of security policy rule components, one or more security rule actions, and zero or more network security policy action targets. The security policy rule component may represent a specific condition or security mechanism, such as a public-key based message authentication or password based user authentication. The network security policy action may apply a network security policy rule component to a target. The network security policy target may identify a target of a security operation, such as from generic data traffic to the header of a message.

Security policy rules may also or alternatively be expressed and enforced with temporal dependencies. For example, a group of users might be allowed to access certain resources only during off-peak hours. An example of such a security policy rule is set forth below:

Rule B:
  If time is between 8 PM and 8 AM, access privilege level must be equal to or greater than group level for trunking resource reservation.

In a similar fashion, a security policy rule may be based on factors such as time of day, type of traffic, and other parameters specified by a user, operator, and/or administrator (hereafter collectively referred to as a "user" or an "operator"). In addition, the policy rule may support policies that take into account the identity and/or credentials of a user requesting a particular service or resource. For example, an RSVP reservation request may be denied or accepted based on the credentials or identity supplied in the request.

Figure 5:
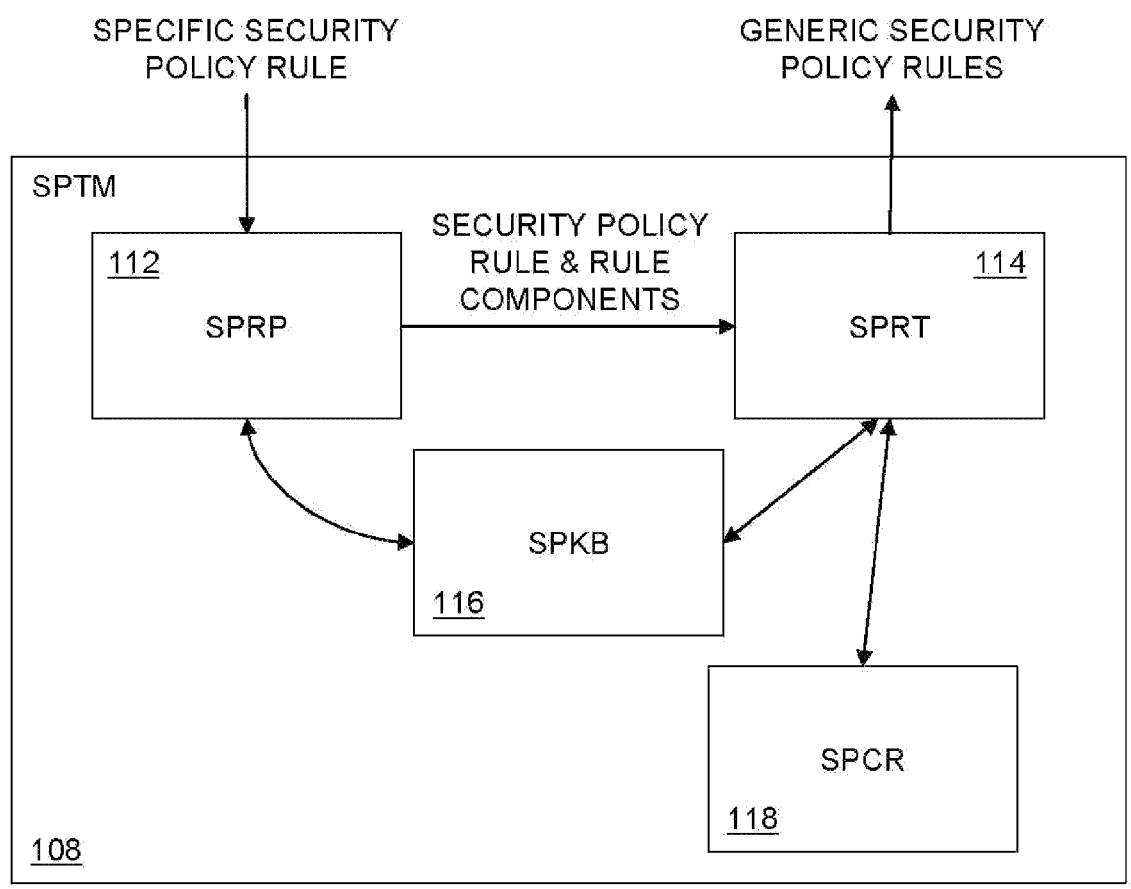
FIG. 5 is a block diagram of at least a portion of a security policy translation module (SPTM) according to one or more aspects of the present disclosure.

Referring to FIG. 5, illustrated is a block diagram of at least a portion of the SPTM 108 described above and shown in FIG. 4. As described above, an initial phase of the security policy mediation process may be translating a security policy rule into a generic security rule that is independent of any specific network technology. This portion of the mediation process may be achieved in whole or in part by the SPTM 108. The SPTM 108 may include a security policy rule parser (SPRP) 112, a security policy rule translator (SPRT) 114, a security policy knowledge base (SPKB) 116, and a security policy component repertoire (SPCR) 118.

The SPRP 112 may break up an input security policy rule into security policy components that form rule actions and/or conditions. The SPRP 112 may also be configured to verify the syntactic correctness of each security policy component.

The SPCR 118 may contain security policy rules, the building blocks of security policy, and security policy rule components, the building blocks of security rules. The SPCR 118 may be a knowledge or information base for security policy rules and rule components that supports ADD, DELETE, and MODIFY operations on the security policy rules and rule components. The SPCR 118 may also include an indexing mechanism for retrieving a rule or rule component based on one or more items, including unique identifiers, rule conditions and actions, target network, etc. The policy rules may all be defined by the components that are defined in the SPCR 118.

The SPRT 114 may be configured to translate a security policy of one network into a set of security policy rules of a network-independent nature, using the SPKB 116. The SPRT 114 may also be configured to translate such a set of security policy rules of a network-independent nature into a security policy for a specific network.

When in an automatic mode, the SPRT 114 may utilize a security policy rule from one network to automatically create a security policy rule that is generic and independent of any specific network technology. However, the SPRT 114 may also be configured to operate in a manual mode, whereby a user may be allowed to utilize a security policy rule to manually translate it into a generic security policy rule using a set of policy rule components manually selected by the user.

The SPRT 114 is configured to allow a user to define an equivalency relationship between two security policy components. There are often inconsistencies or contradictions between two parts of the same security policy or between two different security policies. The SPRT 114 may be configured to detect the inconsistencies and then either resolve them based on the rules defined in the SPKB 116, or flag the user to let the user resolve them manually based on a set of user-defined criteria.

The SPKB 116 contains the constraints for various scenarios and conditions that may be specified by a network operator to ensure the consistency of security policy rules. For example, a security policy rule cannot specify two contradicting or inconsistent encryption methods in a single rule. The SPKB 116 may also contain information pertaining to negotiating the differences between two sets of security policy rules.

The SPKB 116 may be expressed in the form of rules, and may therefore be viewed as "super rules" that control the translation and mapping of the security policy rules. The SPKB 116 may, by itself, be a collection of rules that enforce the constraints and consistency of security rules. For example, an example constraint is "Do not perform authentication if an authentication is already done at an edge node of the same network." The SPKB 116 may also allow an operator to apply any special constraint.

Input into the SPTM 108 may be a network-specific security policy rule, such as "authenticate IP packet header" for an IP network. In such an example, the SPRP 112 breaks the input rule into security policy rule components for the rule condition(s) and action(s). For example, the action may be "authenticate" and the rule components may include "message header" and "network layer." These components may then be fed into the SPRT 114 that maps them into a network-independent rule, such as "authenticate message header." The network-independent rule is then output from the SPTM 108 and input into the next module in the translation process (such as the SPEA 110 shown in FIG. 4).

Figure 6A:
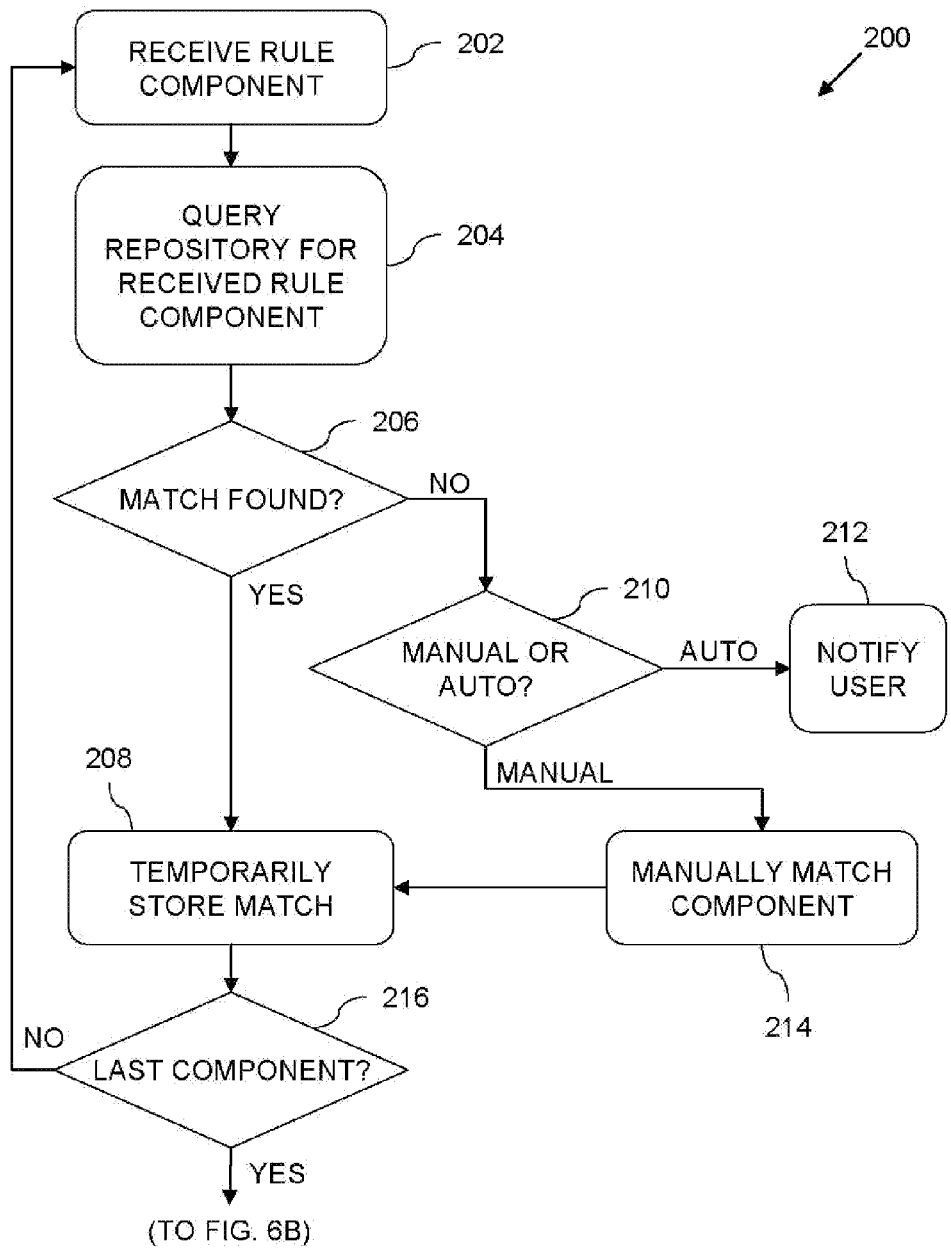
FIG. 6A is a flow-chart diagram of at least a portion of a method according to one or more aspects of the present disclosure.

Referring to FIG. 6A, illustrated is a flow-chart diagram of at least a portion of a method 200 according to one or more aspects of the present disclosure. The method 200 includes a step 202 in which a security policy rule component is received by, for example, the SPMD 106 of FIG. 3, or the SPTM 108 of the SPMD 106 (see FIG. 4), or the SPRP 112 of the SPTM 108 (see FIG. 5).

The method 200 also includes a step 204 during which each component of each security policy rule of the first or originating network is compared against the rule component repository (e.g., the SPCR 118 of FIG. 5) to find a match with a generic security policy rule component. If a match is found, as determined in a decisional step 206, the matched security policy component may be stored in a temporary pair-wise security policy component storage via step 208.

If no match is found, as determined during decisional step 206, and the security policy rule translator (e.g., SPRT 114 of FIG. 5) is operating in auto-mode, as determined by decisional step 210, then the user is notified in a step 212, such as by a visual indication (e.g., a blinking light, textual message, and/or graphic) and/or an audio indication (e.g., one or more audible beeps). However, if no match is found and the security policy rule translator is operating in manual-mode, then the user may manually match the component in a step 214, which may then be stored during step 208.

Figure 6B:
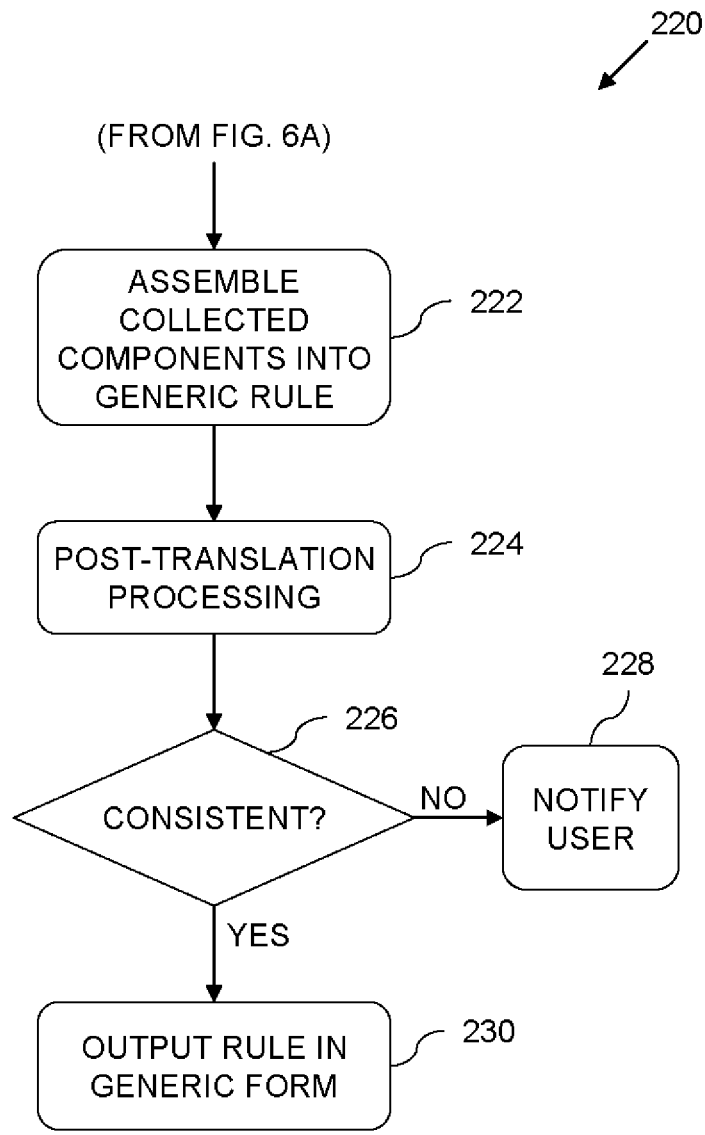
FIG. 6B is a flow-chart diagram of at least a portion of a method according to one or more aspects of the present disclosure.

The method 200 also includes a decisional step 216 to determine whether all of the received rule components have been matched, whether automatically or manually. If all components have been matched, processing may continue as shown in FIG. 6B, for example. However, if additional rule components have been received but not yet matched, then the processing shown in FIG. 6A may be repeated, starting with step 202, for example.

Referring to FIG. 6B, illustrated is a flow-chart diagram of at least a portion of a method 220 according to one or more aspects of the present disclosure. The method 220 may be performed once all received rule components have been processed according to the method 200 shown in FIG. 6A. For example, the methods 200 and 220 may be portions of the same process.

The method 220 includes a step 222 during which the matched components are assembled into a generic security policy rule. In a subsequent post-translation processing step 224, consistency of the generic security policy rule may be checked, and a "sanity check" may be performed, where both such checks may employ information from a knowledge base such as the SPKB 116 shown in FIG. 5.

If consistency and/or sanity is not satisfactorily verified, such as may be determined during a decisional step 226, then the user is notified in a step 228, such as by a visual indication (e.g., a blinking light, textual message, and/or graphic) and/or an audio indication (e.g., one or more audible beeps). However, if consistency and/or sanity are sufficient, then the generic security policy rule may be output in a step 230. Such output may be to a next module of an SPMD, such as the SPEA 110 shown in FIG. 4.

Figure 7:
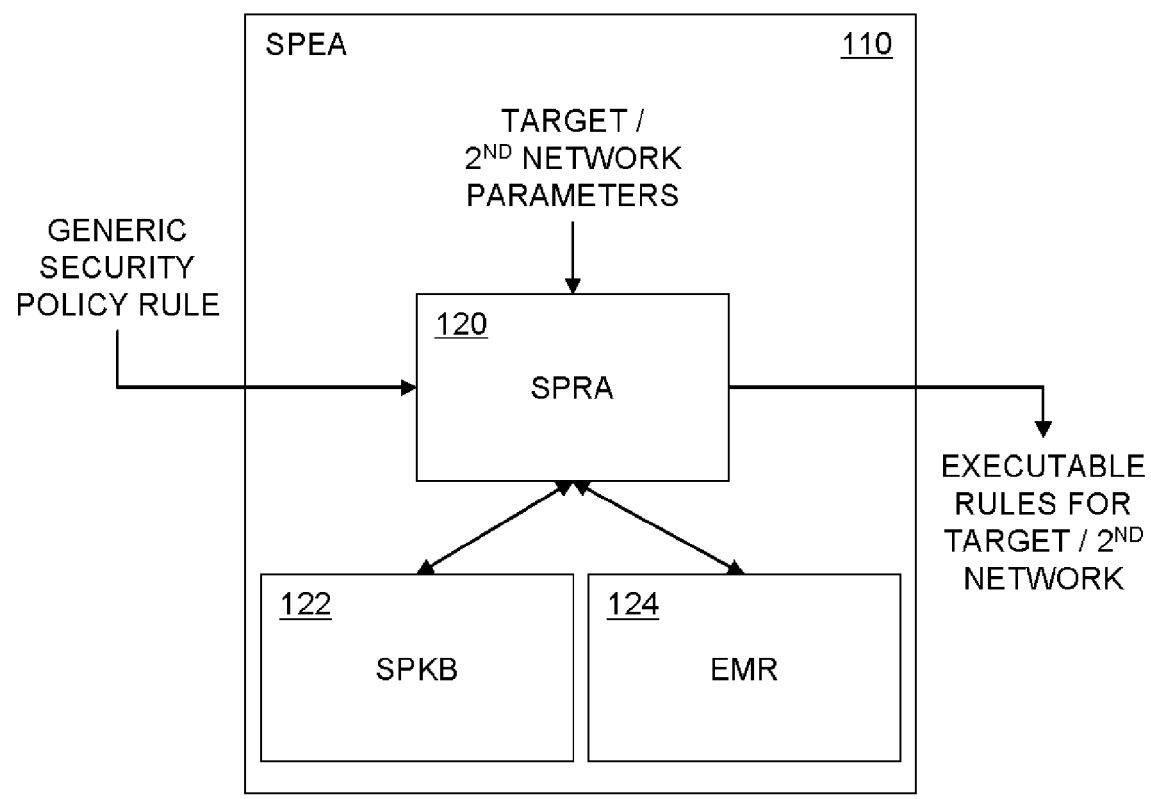
FIG. 7 is a block diagram of at least a portion of a security policy enforcement assembler (SPEA) according to one or more aspects of the present disclosure.

Referring to FIG. 7, illustrated is a block diagram of at least a portion of the SPEA 110 shown in FIG. 4. The SPEA 110 may include a security policy rule assembler (SPRA) 120, a security policy knowledge base (SPKB) 122, and an executable module repertoire (EMR) 124, among other features and/or components.

One responsibility of the SPRA 120 may be to convert a generic security policy rule that is output from the SPTM 108 into a set of rules executable at a target network. In addition to the generic security policy rule, the target network parameters and constraints may also be input into the SPRA 120.

The SPKB 122, like the SPKB 116 of the SPTM 108 shown in FIG. 5, may be a collection of rules that enforce constraints and consistencies of security policy rules. An example of a constraint is that "authentication scheme A cannot be used in a target network if authentication scheme B is already used in the originating network." The SPKB 122 may also allow an operator to apply any special constraint. Table 1 set forth below demonstrates an example of the operation of the SPRA 120.

TABLE 1

| Index | Action | Generic Target | Specific Target | Target Network | Target Action |
|---|---|---|---|---|---|
| 1 | authenticate | message header | IP packet header | IP | authenticate |
| 2 | authenticate | message header | IAM message, ACM message | SS7 | authenticate |
| ... | ... | ... | ... | ... | ... |

A goal of operation of the SPRA 120 is to convert the input generic rule into a rule module that is executable at a target network. The SPRA 120 may take as input a generic security policy rule, which may comprise action and target/conditions devoid of any specific network technology. Thus, the first two items on each row in Table 1 (after the Index) are an action and a generic target, as specified in the generic security policy rule. A combination of a security operation action, an action target, and a specific network condition may also be part of the input to the SPRA 120.

Thereafter, the generic target is mapped into a specific target for a target network where the rule is to be executed, resulting in the specific target shown in Table 1. The last column of Table 1 is the target action. In many cases, but not all cases, the action from the generic security policy rule is the same as the target action.

Figure 8:
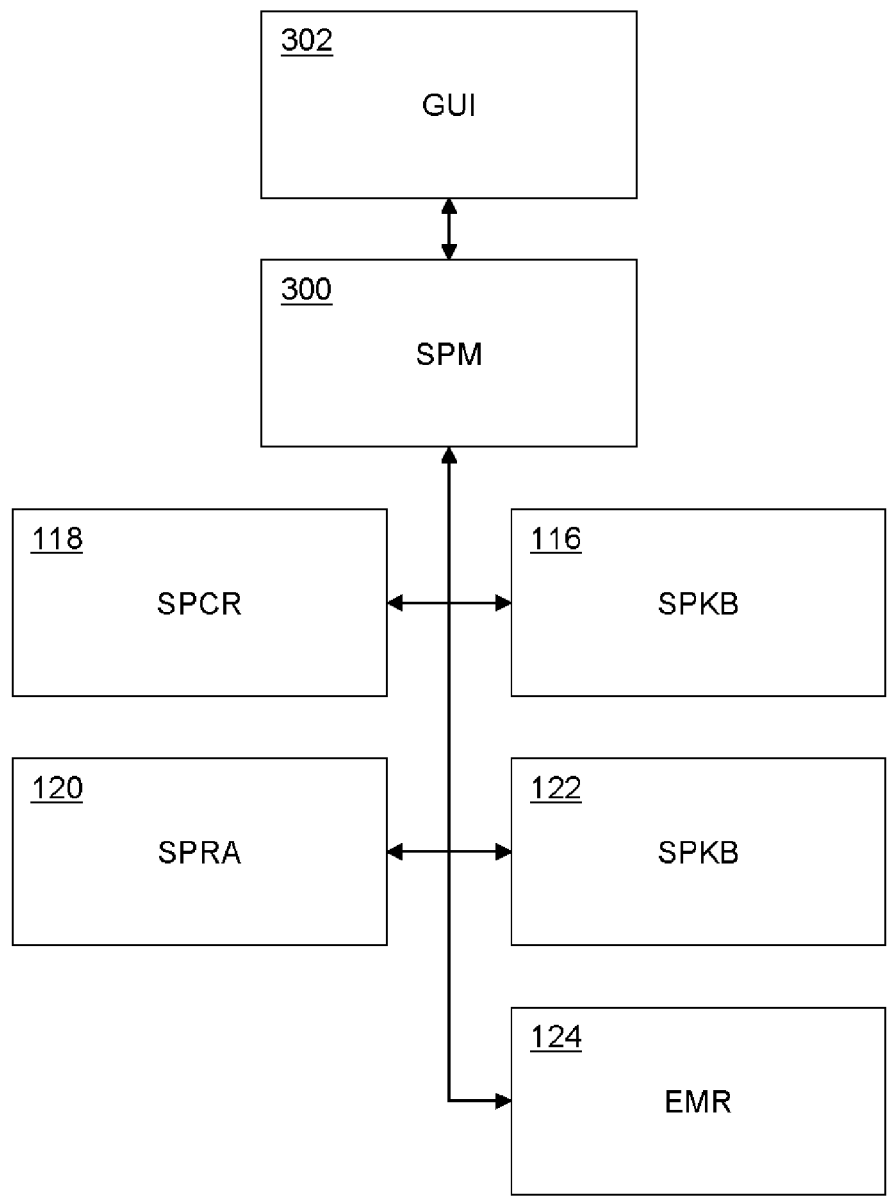
FIG. 8 is a block diagram of at least a portion of a security provisioning module (SPM) according to one or more aspects of the present disclosure.

Thus, referring collectively to FIG. 8 and Table 1, the action, generic target and target network may be utilized to find a specific target, such as via mapping. Once identified, the specific target may be utilized to find a target action. The resulting output from the SPRA 120 includes an index (e.g., the first column in Table 1), a specific target, and a target action.

Each row in Table 1 is unique. The result of the searching performed by the SPRA 120 may be a match, which produces an index into the EMR 124 (as shown below), or no match may be found.

The EMR 124 is a collection of executable modules, programs, and/or parts of programs. Each entry in the EMR 124 may be locally developed, off-the-shelf components, or third-party products. As shown in the example of Table 2 set forth below, each entry in the EMR 124 includes an index and a descriptor that defines the input parameters to the program and output results. In addition, each entry may have a functional module name, text description, constraints, and/or other fields.

TABLE 2

| Index | Descriptor | Restriction | Functional Policy Module |
|---|---|---|---|
| 1 | input parameter = p1, p2, ... | C++, Java | executable component X |
| 2 | output parameter = p1, p2, ... | C, C++, Java | off-the-shelf program Y |
| 3 | output parameter = p1, p2, ... | C, C++, Java | none |
| ... | ... | ... | ... |

Once the network security policy enforcement assembler has successfully converted a set of generic security policy rules into a set of executable modules specifically for a target network, the module is optionally downloaded into the target network. The downloaded network security policy may be carried out at a target network node, such as a media gateway or gateway controller.

At runtime, a method of carrying out the security policy may include determining whether a security policy is turned-on. If so, the security policy may be applied to ingress traffic at the network node according to the downloaded security policy. Traffic that fails the security policy may be discarded, and such results may be reported to a security monitoring application.

Referring to FIG. 8, illustrated is a block diagram of a security provisioning module (SPM) 300 for an SPMD according to one or more aspects of the present disclosure. An SPMD according to aspects of the present disclosure may include or be associated with the SPM 300, such as via a web-based interface, to allow a user to update and/or define new security policy rules and rule components. The SPM 300 may be configured to allow the user to capture the security policy rule component as well as the semantic definition of each component.

The SPM 300 along with a graphical user interface (GUI) 302 is configured to allow a user to update or "provision for" the SPKB 116, SPCR 118, SPRA 120, SPKB 122 and/or EMR 124 described above. The GUI 302 may be implemented in Java, and may be configured to operate remotely as a stand-alone application or as a web-based application. The SPM 300 may conduct an interactive dialogue with the user via the GUI 302 to perform provisioning tasks.

For example, for the security policy rule and rule components, the SPM 300 and GUI 302 may be configured to allow the user to create a new security policy rule or rule component, and to modify or delete an existing security policy rule or component. In relation to the SPKB 116 and/or the SPKB 122, the SPM 300 and GUI 302 may also be configured to allow the user to edit and create a new constraint with regard to the enforcement of a policy rule or the translation of a rule. For the EMR 124, the SPM 300 and GUI 302 may be configured to allow the user to acquire a new security module along with its descriptor and description information, or to designate an existing module as being obsolete.

Figure 9:
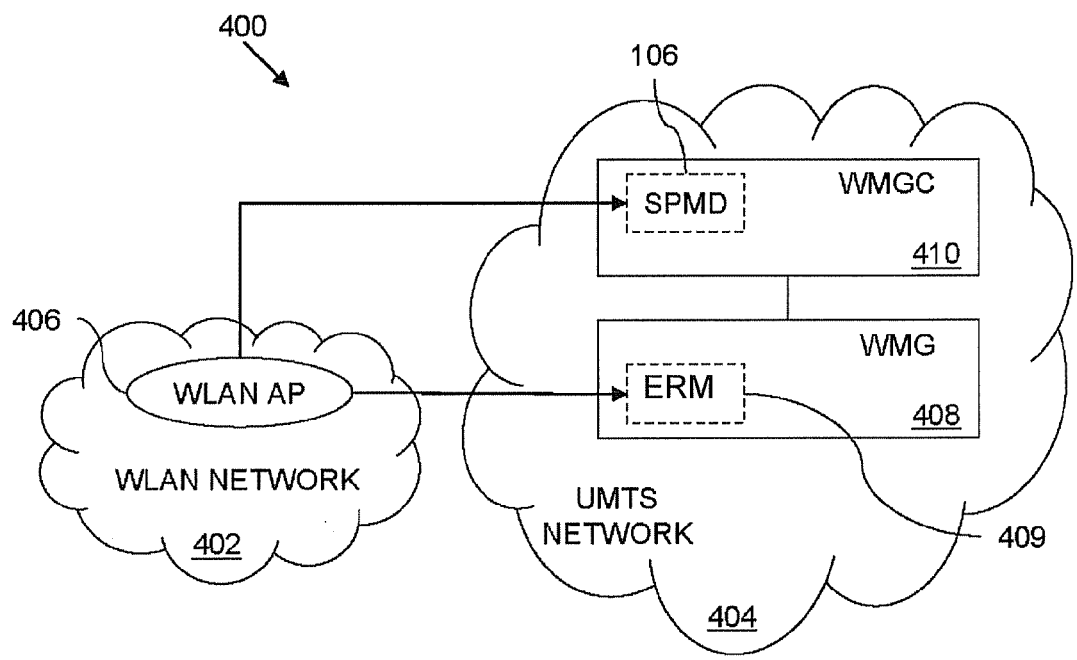
FIG. 9 is a block diagram of at least a portion of a converged network according to one or more aspects of the present disclosure.

Referring to FIG. 9, illustrated is a block diagram of at least a portion of a converged wireless network 400 according to one or more aspects of the present disclosure. The network 400 includes a WLAN network 402 and a UMTS network 404. The WLAN network 402 includes an access point (AP) 406. The UMTS network 404 includes a wireless media gateway (WMG) 408 that includes an executable rule module (ERM) 409, such as that which may be among those collected in an EMR 124 according to one or more aspects of the present disclosure. The UMTS network 404 also includes a wireless media gateway controller (WMGC) 410 that includes an SPMD 106 according to one or more aspects of the present disclosure. The ERM 409 and SPMD 106 of the UMTS network 404 are physically, functionally, and/or operably as described above.

In the embodiment depicted in FIG. 9, the SPMD 106 resides within the WMGC 410 that is utilized to bridge the WLAN network 402 and the UMTS network 404. The security policy of the WLAN network 402 is first translated into that of a generic rule and the generic rules are then converted into a set of executable modules specific to the UMTS network 404. Then, the executables may be downloaded into the connected WMG 408. Such an arrangement supports traffic flow from the WLAN network 402 to the UMTS network 404.

For traffic in the opposite direction, the same translation and mediation process can be performed, such that a set of generic security policy rules can be converted into a set of executable modules specific to the WLAN network 402 and downloaded into the same WMG 408. Consequently, a consistent security policy can be maintained and enforced in both traffic flow directions.

Figure 10:
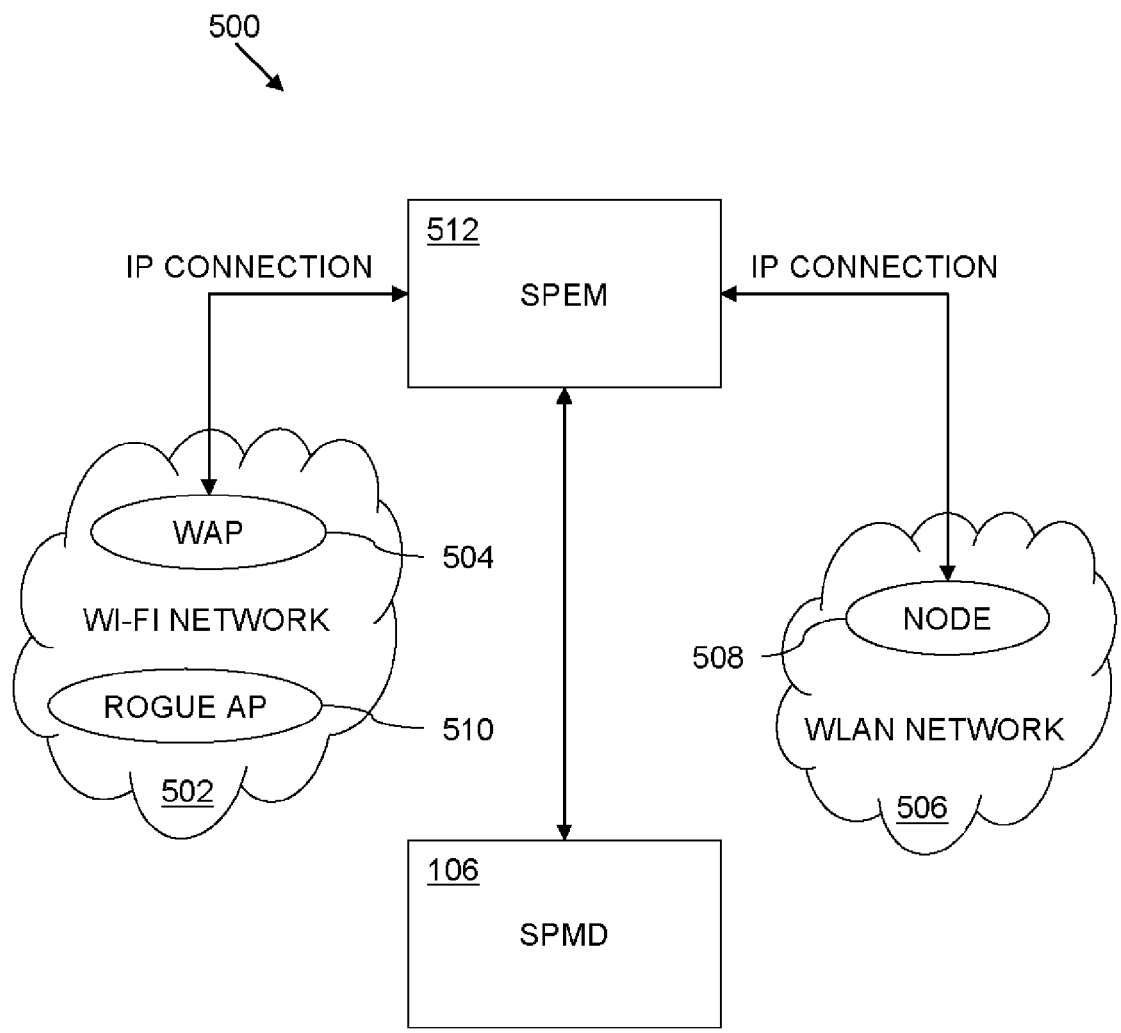
FIG. 10 is a block diagram of at least a portion of a converged network according to one or more aspects of the present disclosure.

Referring to FIG. 10, illustrated is a block diagram of at least a portion of a converged wireless network 500 that includes a stand-alone SPMD 106 according to one or more aspects of the present disclosure. The network 500 also includes a Wi-Fi network 502 that uses the WEP encryption scheme to authenticate a user ID. The Wi-Fi network 502 includes a wireless access point (WAP) 504. The network 500 also includes a wireless LAN network 506, such as an Ethernet LAN, having a node 508.

FIG. 10 demonstrates an environment that incorporates an SPMD 106 according to one or more aspects of the present disclosure, where the SPMD 106 is implemented as an independent device residing between different networks. The concern in conventional implementations of such an arrangement is that a legitimate Wi-Fi user originates a call from a legitimate access point, such as WAP 504, and a rogue AP 510 subsequently monitors the packets originating from the legitimate WAP 504 and attempts to reroute the call to a different destination.

However, in the arrangement depicted in FIG. 10, all of the traffic to or from the Wi-Fi network 506 must go through a security policy enforcement module (SPEM) 512 which is connected to the SPMD 106. A preferred security policy is to authenticate all traffic and, thereby, detect any modification to the original packets, including call rerouting attempts at the SPMD 106.

For example, to ensure the integrity of data transmitted between the WAP 504 and the Ethernet node 508, and to prevent any modification to the data, a public-key based encryption security policy may be used at the Wi-Fi network 502, and may also be enforced at the IP network 506. The security policy rule may be expressed as a rule at the Wi-Fi network 502, such as "apply WEP to IP layer message body." At the SPEM 512, the original security rule may be translated to a corresponding rule, such as "apply authentication to message body." The generic rule may be mapped to an executable RSA-based encryption module for the IP network 506. Optionally, the executable module may be downloaded into the node 508.

In view of all of the above, it should be clear that the present disclosure introduces utilizing a rule-based security policy translator to convert a network specific security policy into a generic security policy, and subsequently utilizing an enforcement assembler to convert the generic security policy into a security policy module executable at a target network.

For example, the present disclosure introduces a method for mediating between first and second network security policies, including mapping a first security policy to a second security policy, wherein the second security policy is generic. The second security policy is then mapped to a plurality of rules each associated with a target network security policy.

The present disclosure also introduces a system configured to mediate between an originating network security policy and a target network security policy. At least in one embodiment, the system includes: (1) a security policy translator configured to map first rules of the originating network security policy to second rules of a generic network security policy; and (2) a security policy assembler configured to map the second rules of the generic network security policy to third rules of the target network security policy.

The present disclosure also introduces a system configured to mediate between first and second network security policies. At least in one embodiment, the system includes: (1) first mapping means for mapping the first security policy to a generic security policy; and (2) second mapping means for mapping the generic security policy into rules deployable within the second network security policy.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A method for mediating between first and second network security policies, comprising:
    mapping, by a security policy mediation device (SPMD) including at least one hardware processor, a first security policy to a second security policy, wherein the second security policy is a generic network-independent policy that is devoid of any specific network technology; and
    mapping, by the SPMD, the second security policy to a plurality of rules, each associated with a target network security policy and collectively executable at the target network, wherein one policy of the first security policy and the target network security policy is operable for an IP-based network and the other policy of the first security policy and the target network security policy is operable for a signaling system number 7 (SS7) network, wherein mapping between the second security policy and the plurality of rules each associated with a target network security policy and collectively executable at the target network includes searching a repository, using the second security policy, for one or more executable security modules for including in the target network security policy; and
    wherein mapping the second security policy to the plurality of rules associated with the target network security policy comprises:
        deconstructing each rule of the second security policy into at least one generic action and at least one generic target;
        mapping the at least one generic action into at least one action deployable in the target network security policy; and
        mapping the at least one generic target to at least one target of the target network security policy; and
        wherein the SPMD provides a consistent end-to-end security policy comprised of the first security policy and the target network security policy, across a convergent network including the SS7 network and the IP-based network.

2. The method of claim 1 wherein mapping the first security policy to the second security policy comprises creating first security policy components based on rules of the first security policy, and verifying syntactic correctness of the first security policy components.

3. The method of claim 1 wherein mapping the first security policy to the second security policy comprises creating first security policy components based on rules of the first security policy and then comparing the first security policy components with a collection of generic security policy rules and components.

4. The method of claim 3 wherein mapping the first security policy to the second security policy comprises, if no match is found between any of the first security policy components and the collection of generic security policy rules and components, generating an indication to a user that no match was found.

5. The method of claim 3 wherein mapping the first security policy to the second security policy comprises, if no match is found between any of the first security policy components and the collection of security rules and components, manually matching the unmatched first security policy component to a component of the second security policy.

6. The method of claim 1 wherein mapping the second security policy to the rules associated with the target network security policy comprises:
    generating a first indication of all the generic targets that did not map to a target of the target network security policy; and
    generating a second indication of all the generic actions that did not map to an action of the target network security policy.

7. A system configured to mediate between an originating network security policy and a target network security policy, the system comprising:
    a security policy mediation device (SPMD) comprising:
    a hardware processor; and
    a memory, wherein the memory stores instructions that when executed by the at least one hardware processor performs the steps comprising:
        mapping first rules of an originating network security policy to second rules of a generic security policy that is devoid of specific network technology; and
        mapping the second rules of the generic network security policy to third rules of a target network security policy, wherein one policy of the originating network security policy and the target network security policy is operable for an IP-based network and the other policy of the originating network security policy and the target network security policy is operable for a signaling system number 7 (SS7) network, wherein mapping between the second rules of the generic network security policy and the third rules of the target network security policy each associated with the target network security policy and collectively executable at the target network includes searching a repository, using the second security policy, for one or more executable security modules for including in the target network security policy;
wherein mapping the second rules of the generic network security policy to second third rules of the target network security policy comprises:
deconstructing each of the second rules into at least one generic action and at least one generic target,
mapping the at least one generic action into at least one action deployable in the target network security policy; and
mapping the at least one generic target to at least one target of the target network security policy; and
wherein the SPMD provides a consistent end-to-end security policy comprised of the originating network policy and the target network security policy across a convergent network that includes the SS7 network and the IP-based network.

8. The system of claim 7 wherein the SPMD comprises a security policy translator and a security policy rule parser configured to parse rules from the first network security policy and verify syntactic correctness of the rules from the first network security policy.

9. The system of claim 7 wherein the SPMD comprises a knowledge base configured to store security policy rules and security policy rule components for at least one of the originating, generic, and target network security policies.

10. The system of claim 7 wherein the SPMD comprises a security policy translator configured to allow at least one of manual and automatic translation of a first security policy rule to a second security policy rule.

11. The system of claim 7 wherein the SPMD comprises an executable module repertoire containing a plurality of executable modules, programs, and/or program parts which are deployable within the context of the target network security policy.

12. The system of claim 7 wherein the SPMD comprises a network security provisioning module that defines new security policy components and new security policy rules of at least one of the originating, generic, and target network security policies.

13. The system of claim 12 wherein the network security provisioning module is remotely accessible via the Internet.

* * * * *